United States Patent
Stolcke et al.

(10) Patent No.: US 9,583,105 B2
(45) Date of Patent: Feb. 28, 2017

(54) MODIFICATION OF VISUAL CONTENT TO FACILITATE IMPROVED SPEECH RECOGNITION

(71) Applicant: Microsoft Corporation, Redmond, WA (US)

(72) Inventors: Andreas Stolcke, Berkley, CA (US); Geoffrey Zweig, Sammamish, WA (US); Malcolm Slaney, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/297,742

(22) Filed: Jun. 6, 2014

(65) Prior Publication Data

US 2015/0356971 A1     Dec. 10, 2015

(51) Int. Cl.
| | | |
|---|---|---|
| G10L 15/22 | (2006.01) | |
| G10L 15/24 | (2013.01) | |
| H04N 7/18 | (2006.01) | |
| G06F 17/21 | (2006.01) | |
| G06F 17/24 | (2006.01) | |

(52) U.S. Cl.
CPC ............ *G10L 15/24* (2013.01); *G06F 17/212* (2013.01); *G06F 17/243* (2013.01); *H04N 7/183* (2013.01)

(58) Field of Classification Search
CPC ............................... G10L 15/24; G06F 17/212
USPC ........................................ 704/231, 237–239
See application file for complete search history.

(56) References Cited

U.S. PATENT DOCUMENTS

| | | | |
|---|---|---|---|
| 6,629,074 B1* | 9/2003 | Tannenbaum | G10L 15/28 704/270 |
| 7,036,080 B1 | 4/2006 | James et al. | |
| 7,340,399 B2 | 3/2008 | Friedrich et al. | |
| 2005/0182558 A1* | 8/2005 | Maruta | 701/200 |
| 2007/0101263 A1* | 5/2007 | Bedingfield, Sr. | G06F 3/0485 715/205 |
| 2008/0141166 A1* | 6/2008 | Goldberg | G06F 3/04817 715/788 |
| 2008/0281597 A1* | 11/2008 | Suzuki | 704/258 |
| 2009/0171669 A1* | 7/2009 | Engelsma et al. | 704/275 |

(Continued)

FOREIGN PATENT DOCUMENTS

WO     2006086511 A2     8/2006

OTHER PUBLICATIONS

Zhang, et al., "A Gaze and Speech Multimodal Interface", In Proceedings of the 24th International Conference on Distributed Computing Systems Workshops, Mar. 23, 2004, 7 pages.

(Continued)

*Primary Examiner* — Marcellus Augustin
(74) *Attorney, Agent, or Firm* — Alin Corie; Sandy Swain; Micky Minhas

(57) ABSTRACT

Technologies described herein relate to modifying visual content for presentment on a display to facilitate improving performance of an automatic speech recognition (ASR) system. The visual content is modified to move elements further away from one another, wherein the moved elements give rise to ambiguity from the perspective of the ASR system. The visual content is modified to take into consideration accuracy of gaze tracking. When a user views an element in the modified visual content, the ASR system is customized as a function of the element being viewed by the user.

20 Claims, 8 Drawing Sheets

(56) References Cited

U.S. PATENT DOCUMENTS

| | | | |
|---|---|---|---|
| 2011/0161076 A1 | 6/2011 | Davis et al. | |
| 2012/0272179 A1 | 10/2012 | Stafford | |
| 2012/0295708 A1 | 11/2012 | Hernandez-Abrego et al. | |
| 2013/0125051 A1* | 5/2013 | Kelley | G06F 17/3007 715/810 |
| 2013/0304479 A1 | 11/2013 | Teller et al. | |
| 2013/0307771 A1* | 11/2013 | Parker et al. | 345/158 |

OTHER PUBLICATIONS

Miniotas, et al., "Speech-Augmented Eye Gaze Interaction with Small Closely Spaced Targets", In Proceedings of Symposium on Eye Tracking Research & Applications, Mar. 27, 2006, pp. 67-72.

Cooke, et al., "Gaze-Contingent Automatic Speech Recognition", In Proceedings of IET Signal Processing, vol. 2, Issue 4, Dec. 2008, pp. 369-380.

"Response to the International Search Report and Written Opinion Issued in PCT Application No. PCT/US2015/033865", Mailed Date: Mar. 23, 2016, 8 Pages.

"International Search Report and Written Opinion Issued in PCT Application No. PCT/US2015/033865", Mailed Date: Dec. 17, 2015, 10 Pages.

"Written Opinion Issued in PCT Application No. PCT/US2015/033865", Mailed Date: Apr. 20, 2016, 5 Pages.

"International Preliminary Report on Patentability Issued in PCT Application No. PCT/US2015/033865", Mailed Date: Jul. 11, 2016, 6 Pages.

"Repsonse to the Second Written Opinion Issued in PCT Application No. PCT/US2015/033865", Filed Date: May 11 2016, 8 Pages.

\* cited by examiner

MODIFICATION OF VISUAL CONTENT TO FACILITATE IMPROVED SPEECH RECOGNITION

BACKGROUND

Automatic speech recognition (ASR) systems are configured to recognize spoken utterances set forth by users. With more particularity, a microphone generates an electrical signal responsive to capturing audio, wherein the audio includes the spoken utterance. The electrical signal is processed to filter noise from the audio and extract features that can be used to recognize the spoken utterance. While performance (e.g., speed and accuracy) of ASR systems has greatly improved over the last several years, conventional ASR systems continue to have difficulty when large vocabularies are considered, when the ASR systems have not been trained with suitable training data that is representative of particular accents or dialects, or when other suboptimal conditions exist. Moreover, ASR systems often have difficulty recognizing spoken utterances set forth in noisy environments, such as when the utterance is set forth in a crowded airport, in a moving automobile, etc.

SUMMARY

The following is a brief summary of subject matter that is described in greater detail herein. This summary is not intended to be limiting as to the scope of the claims.

Described herein are technologies that facilitate receiving a page for presentment on a display, the page comprises a first visual element and a second visual element at a first distance from one another. The page is modified to generate a modified page, the modified page includes the first visual element and the second visual element at a second distance from one another, wherein modification of the page is based upon similarity of pronunciation between at least one word corresponding to the first visual element and at least one word corresponding to the second visual element. The page is then caused to be displayed on the display.

DETAILED DESCRIPTION

Figure 1:
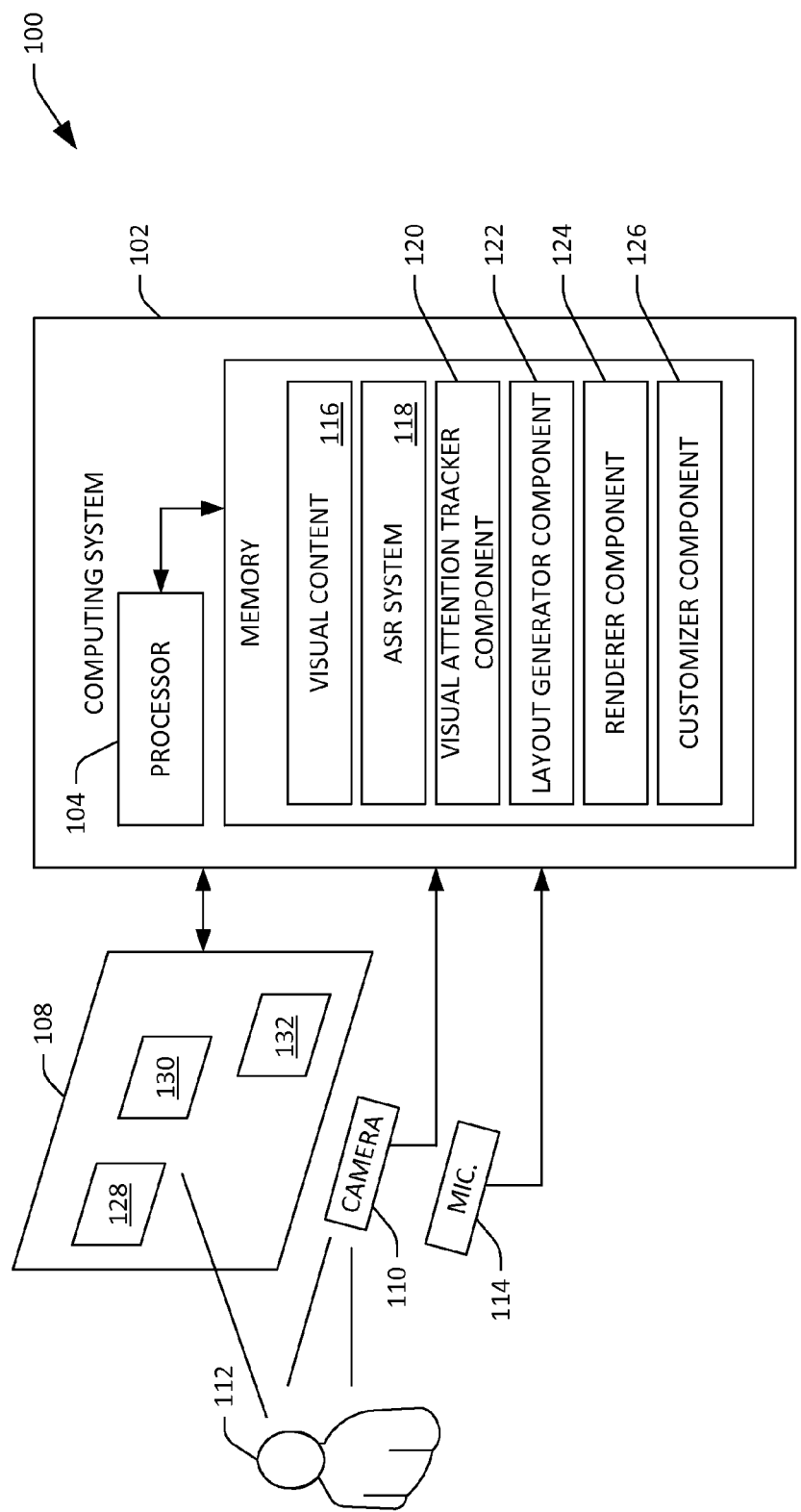
FIG. 1 is a functional block diagram of an exemplary system that is configured to modify visual content.

Various technologies pertaining to modifying visual content are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to modifying visual content on a display to facilitate disambiguating intent of a user when the user sets forth a spoken utterance. Disambiguating the intent of the user includes recognizing the spoken utterance set forth by the user in concert with the visual content shown on the display (over time). A display is configured to present visual content thereon, where the visual content may be or include text, images, fields (form-fillable fields), video, buttons, pull-downs, etc. Accordingly, the visual content may be included in a page that is to be presented on the display, such as a web page or a page of an application (e.g., a word processing application, a slideshow presentation application, etc.).

Visual attention of the user is monitored relative to the display. For example, the display may have a camera (e.g., a red-green-blue (RGB) camera and/or a depth camera) proximate thereto or embedded therein. The camera outputs signals (e.g., images), which can be analyzed to determine head pose and orientation, which in turn is utilized to infer visual attention (e.g., gaze direction) of the user. In another example, the images can be analyzed to identify portions of an eye, such as the pupil, iris, cornea, etc., and visual attention can be inferred based upon identified portions of the eye.

A microphone is configured to generate signals that are indicative of audio in an environment proximate to the display. The audio may include spoken utterances of the user, and the signals output by the microphone can be provided to an ASR system, which is configured to recognize the spoken utterances. The technologies described herein facilitate use of visual attention to disambiguate intent of the user when the user sets forth spoken utterances. As determination of visual attention, however, may be somewhat imprecise, aspects described in greater detail herein pertain to modifying the visual content for presentment on the display, wherein this modification is undertaken to facilitate disambiguating visual elements being viewed by the user.

Pursuant to an example, the visual content to be presented on the display may include a first word sequence and a second word sequence, wherein the first word sequence is confusingly similar in some manner to the second word sequence. For instance, the first word sequence may be acoustically similar to the second word sequence. In another example, the first word sequence and the second word sequence may be topically similar. The visual content can be analyzed, and scores can be generated for pairs of visual elements, wherein the scores are indicative of confusability (e.g., from the perspective of the ASR system) between the visual elements in the pair. For instance, acoustic similarity may be scored based on comparing word pronunciations. Based upon the scores, the visual content can be modified, wherein modification of the visual content can include changing a distance between visual elements in the visual content.

Continuing with the example set forth above, a score computed for the pair of the first word sequence and the second word sequence can indicate that the two word sequences are confusingly similar, and may be a source of ambiguity for the ASR system. Based upon the score, the visual content can be modified such that the first word sequence is positioned further from the second word sequence. This modified visual content may then be presented on the display. As the user is viewing the display, visual attention of the user can be monitored, and based upon the monitored visual attention it can be ascertained (with some probability) that the user is viewing the first word sequence rather than the second word sequence. The ASR system can then be customized based upon the first word sequence. In other words, the current context of the user (e.g., what the user is looking at on the display) is used to customize the ASR system, facilitating improved recognition of forthcoming utterances. In summary, then, the modification of the visual content is undertaken to facilitate disambiguating what is being viewed by the user, which in turn is used to customize the ASR system.

In another example, a cue can be provided relative to a visual element presented on the display, where the cue informs the user that it is believed that the user is focusing on the visual element. The cue can be an audio cue, a graphical icon (e.g., a mouse pointer), highlighting of the visual element, etc. Therefore, when the user sets forth a spoken utterance, the user can have knowledge that the ASR system is being customized based upon the visual element. To further assist in disambiguating which visual element or elements are being viewed by the user, gestures can also be recognized. For instance, in addition to visual attention tracking, the images captured by the camera can be analyzed to identify where the user is pointing, nodding, etc., which in turn can be employed to identify the visual element being focused on by the user.

With reference now to FIG. 1, an exemplary system 100 that facilitates modifying visual content presented on a display is illustrated, wherein the modification of the visual content is undertaken to facilitate disambiguating intent of a user setting forth spoken utterances. The system 100 includes a computing system 102, which can be, but is not limited to being, a desktop computing device, a laptop computing device, a mobile computing device (such as a mobile telephone or slate computing device), a video game console, a set top box, a television, etc. In other examples, the computing system 102 may be distributed across several computing devices. Still further, at least a portion of the computing system 102 may be included in a data center. The computing system 102 includes a processor 104 and a memory 106, wherein the memory 106 comprises components and/or systems that are executed by the processor 104. Such components and systems will be described in greater detail below.

The system 100 additionally includes a display 108 that is in communication with the computing system 102. While the display 108 is illustrated as being separate from the computing system 102, in another example, the display 108 can be incorporated in the computing system 102. Thus, for example, the display 108 may be a display of a mobile computing device, a display of a laptop computing device, a display of a television, etc. In another example, the display 108 may be a projected display.

The system 100 further comprises a camera 110, which can be red-green-blue (RGB) camera, a grayscale camera, and/or a depth camera. The camera 110 is configured to capture images of (at least a head of) a user 112 as the user 112 views visual content presented on the display 108. The system 100 also includes a microphone 114 that is positioned in proximity to the user 112 and/or the display 108, and therefore is configured to capture spoken utterances set forth by the user 112. While the camera 110 and the microphone 114 are illustrated in FIG. 1 as being separate from the display 108 and/or the computing system 102, it is to be understood that the camera 110 and/or the microphone 114 can be integrated in the display 108 and/or the computing system 102.

The memory 106 of the computing system 102 can include visual content 116 that is to be presented on the display 108. In an example, the visual content 116 can be included in a web page. Accordingly, the visual content 116 can include text, images, video, animation, or the like. In another example, the visual content 116 can be configured to be displayed by a computer-executable application, such as a word processing application, a spreadsheet application, a slideshow application, a video player, or the like. In still another example, the visual content 116 may be a video program, an advertisement, a portion of a video game, or other suitable visual content. The visual content 116 can include several visual elements, such as words, sequences of words, images, video clips, etc. The visual content 116 can have a first layout and the elements may be included in the visual content 116 in accordance with the first layout.

The memory 106 also includes an automatic speech recognition (ASR) system 118, which is configured to recognize spoken utterances set forth by the user 112 based upon output of the microphone 114. The memory 106 also includes a visual attention tracker component 120 that is configured to identify an eye gaze direction of the user 112 based upon images (RGB and/or depth images) output by the camera 110. In an example, the visual attention tracker component 120 can identify head pose and rotation of the user 112, and the visual attention tracker component can infer where the user 112 is focusing (e.g., the gaze direction of the user 112) based upon the head pose and rotation of the user 112. In another example, the visual attention tracker component 120 can analyze images output by the camera 110 and can identify the eyes of the user 112 in such images. For instance, the gaze tracker component 120 can identify elements of the eye, such as the pupil, iris, and/or cornea, and can infer gaze direction of the user 112 based upon the detected locations of such eye elements (e.g., in combination with head pose and rotation).

Presuming that the location of the camera 110 is at least roughly known relative to the display 108, and the location of the user 112 is at least roughly known relative to the display 108, the visual attention tracker component 120 can estimate a region on the display 108 being viewed by the user 112 (e.g., with some suitable probability). Accuracy of the visual attention tracker component 120 relative to the display 108 can be determined during a calibration phase (e.g., during manufacture or during actual use). Such accuracy can be a function of the form factor of the display 108 (e.g. size of the display), resolution of the camera 110 (whether depth or RGB), capabilities of the processor 104, size of the memory 106, etc. The accuracy of the visual attention tracker component 120 can allow for boundaries (size) of a region to be identified, where the user 112 may be viewing any visual elements in the region.

The memory 106 can further include a layout generator component 122, which is particularly well-suited for inclusion in computing devices that support both ASR and visual attention monitoring. The layout generator component 122 is configured to modify the visual content 116 to create modified visual content (which may also be referred to as "new" visual content), wherein the layout generator component 122 performs such modification prior to the visual content 116 being presented on the display 108. The layout generator component 122 performs such modification to facilitate disambiguating intent of the user 112 when the user 112 is viewing the display 108 and/or otherwise interacting with the display (e.g., issuing spoken utterances relative to content shown on the display).

Generally, the layout generator component 122 receives an indication that the computing system 102 supports visual attention monitoring. The layout generator component 122 can optionally receive an indication that the computing system 102 comprises the ASR system 118. The layout generator component 122 receives the visual content 116 that is to be presented on the display 108, and modifies such visual content to generate modified (new) visual content prior to the visual content 116 being presented on the display 108. The layout generator component 122 modifies the visual content 116 based upon elements in the visual content 116 (as will be described in greater detail below), the first layout of the visual content 116, and the above-referenced accuracy of the visual attention tracker component 120.

With more detail regarding modifying the visual content 116 based upon elements therein, the layout generator component 122 can receive the visual content 116 and can identify elements therein. The layout generator component 122 can compute distances between elements and, for a pair of elements, can compute a value that is indicative of ambiguity between the elements in the pair with respect to the ASR system 118. For example, the first layout of the visual content 116 may include two word sequences in close proximity to one another whose pronunciations are similar to one another, thus potentially rendering it difficult for the ASR system 118 to disambiguate between the two word sequences when one of such sequences is uttered by the user 112. The layout generator component 122 can modify the visual content 116 to generate the modified visual content, wherein the modified visual content has a second layout, and in the second layout the two word sequences are moved further apart from one another (or separated by other content). Therefore, the layout generator component 122 has modified the visual content 116 to cause the word sequences with similar pronunciations to be moved further apart from one another.

In another example, the layout generator component 122 can modify the visual content 116 by altering a zoom level of the visual content 116. That is, the visual content 116 may have a default zoom level assigned thereto. The layout generator component 122 can analyze the visual content 116 and identify elements therein that are in close proximity to one another and may be, in some manner, potentially ambiguous to the ASR system 118. The layout generator component 122 can cause the visual content to be "zoomed in" at a particular location such that the elements, when presented on the display 108, are positioned further from one another.

The memory 106 also includes a renderer component 124 that causes the modified visual content to be presented on the display 108, where the modified visual content can be viewed by the user 112. The memory 106 further includes a customizer component 126 that customizes the ASR system 118 based upon viewing context of the user 112 (e.g., based upon output of the visual attention tracker component 120). Customizing of the ASR system 118 is intended to encompass 1) modifying weights in models in the ASR system 118 based upon the viewing context of the user; 2) weighting output of the ASR system 118; and 3) modifying weights in models in the ASR system 118 and weighting output of the ASR system 118.

Operation of the system 100 when the user 112 is viewing the display 108 is now set forth. The user 112 positions herself to view the display 108. The memory 106 includes the visual content 116 which is to be presented on the display 108 to the user 112. As the computing system 102 supports visual attention tracking and comprises the ASR system 118, the layout generator component 122 can be triggered to analyze the visual content 116 for modification. The layout generator component 122 receives the visual content 116 and searches the visual content 116 for elements therein that may give rise to ambiguity with respect to the ASR system 118 when the user 112 sets forth spoken utterances relative to at least one of such elements. For instance, the layout generator component 122 can identify acoustically similar words or word sequences, elements that are topically similar, form-fillable fields in close proximity to one another, buttons in close proximity to one another, etc.

Pursuant to an example, the layout generator component 122 can employ a box-and-springs-type model, wherein elements in the visual content 116 are connected with "springs" that push them apart or pull them together based on their potential ambiguity with respect to the ASR system 118. The distance that ambiguous elements are to be moved apart from one another can be a function of the accuracy of the visual attention tracker component 120 (e.g., the more accurate the visual attention tracking capability, the less far apart ambiguous elements need to be moved, while as accuracy of visual attention tracking decreases, ambiguous elements are moved further apart). Repositioning elements in the visual content 116 may be particularly beneficial when the elements are form-fillable fields, as the ASR system 118 may use different language models, respectively, for the different form-fillable fields. Thus, two form-fillable fields associated with two different language models can be moved further apart by the layout generator component 122.

The renderer component 124 renders the modified visual content (modified by the layout generator component 122) on the display 108. In the example shown in FIG. 1, the modified visual content can include elements 128, 130, and 132. In the visual content 116, elements 128 and 132 may be adjacent to one another. The layout generator component 122, however, may have ascertained that the elements 128 and 132 may give rise to ambiguity with respect to the ASR system 118 (e.g., the ASR system 118 may have difficulty identifying which of the elements 128 or 132 the user 112 is referencing when setting forth spoken utterances). Therefore, the layout generator component 122 has modified the visual content 116 such that the elements 128 and 132 are moved further apart from one another.

The visual attention tracker component 120 receives images from the camera 110 and estimates, for example, the gaze direction of the user 112 based upon the images output by the camera 110. As the direction of gaze of the user 112 can be estimated, an estimate regarding which (if any) of the elements 128-132 is being viewed by the user 112 can be generated. Pursuant to an example, when the visual attention tracker component 120 estimates that the user 112 is viewing a particular element, the layout generator component 122 can generate an output that indicates to the user 112 that the visual attention tracker component 120 has estimated that the user 112 is viewing the particular element. The output generated by the layout generator component 122 can be an audible output, addition of a graphical icon over the particular element (e.g., a cursor), highlighting of the particular element, etc.

The customizer component 126 can receive an indication as to which of the elements 128-132 is being viewed by the user 112. Responsive to receiving this indication, the customizer component 126 can customize the ASR system 118 based upon the element on the display 108 being viewed by the user 112 (as determined by the visual attention tracker component 120). For example, the customizer component can alter weights in an acoustic model, a lexicon model, and/or a language model of the ASR system 118 based upon the element determined as being viewed by the user 112. Additionally or alternatively, the customizer component 126 can select outputs of the (potentially unmodified) ASR system 118 based upon the element determined as being viewed by the user 112. The customizer component 126 can weight output labels of the ASR system 118 for different contexts. In another example, the customizer component 126 can use rules to select output of the ASR system 118 (e.g., when a form-fillable field that is configured to receive a city name is being viewed by the user 112, a rule can cause a city name to be selected from potential outputs of the ASR system 118). Effectively, then, the customizer component 126 customizes the ASR system 118 based upon context— what the user 112 is viewing, thereby facilitating enhancement of a probability that the ASR system 118 will correctly recognize spoken utterances of the user 112.

When the user 112 sets forth a spoken utterance, the microphone 114 can capture such spoken utterance and output a signal that is representative of the spoken utterance. The ASR system 118, customized by the customizer component 126, can recognize the spoken utterance based upon the signal output by the microphone 114. The ability to accurately determine what is being viewed by the user 112 is enhanced by the modification of the visual content 116 performed by the layout generator component 122. In summary, the system 100 supports modification of the visual content 116, such that potentially ambiguous elements are moved far enough apart to make it easier for the visual attention tracker component 120 to differentiate between elements being viewed. The layout generator component 122 can perform this operation automatically by taking into consideration accuracy of the visual attention tracker component 120, as well as elements and layout of the visual content 116. Further, as the visual attention tracker component 120 can have knowledge about what is being viewed by the user 112, inferences can be made about what the user 112 will speak about. This information can be provided to the ASR system 118, assisting the ASR system 118 in understanding the intent of the user 112. Therefore, for example, when the element 132 is a form-fillable field for receiving a destination city and the visual attention tracker component 120 determines that the user 112 is looking at such form-fillable field, then the customizer component 126 can anticipate that the user 112 will issue a spoken utterance that includes a name of a city or airport. The customizer component 126 can thus modify the language model of the ASR system 118 to prominently weight city and/or airport names.

While this example has discussed modifying the visual content 116 at time of rendering, concepts described herein are also well-suited for modifying visual content at time of creation. For example, a designer can generate a layout for a web page, and the layout generator component 122 can receive the layout. The layout generator component 122 may then make modifications to the layout, and present the modifications to the designer (who may then choose to accept or reject the proposed layout changes). Again, the layout generator component 122 can make these layout changes to assist the ASR system 118 in recognizing spoken utterances set forth by viewers of the web page.

In accordance with yet another example, in addition to monitoring visual attention, the memory 106 may include a component (not shown) that is configured to recognize gestures, such as the user 112 pointing at an element. A combination of recognition of where the user 112 is pointing and where the user 112 is looking on the display 108 can be used to infer what is of interest to the user 112 and to further infer what the user 112 is next going to say. Thus, the customizer component 126 can customize the ASR system 118 based upon what is inferred to be of interest to user 112.

Moreover, while aspects described herein have been described with respect to the ASR system 118, it is to be understood that layout modification, as described above, can be used in other contexts. For example, personal digital assistants have been developed that are configured to anticipate wishes of computer users, such that, for example, a personal digital assistant can provide data to a user without receipt of a spoken utterance from the user. Visual content can be modified to reduce ambiguity with respect to what the user is viewing on the display, and the personal digital assistant can provide content using the modified layout. For instance, the visual content 116 may include two elements: a first element that is representative of an Italian restaurant and a second element that is representative of an Italian festival. The layout generator component 122 can cause the two elements to be moved further apart from one another; thus, when it is discerned that the user 112 is viewing the first element, the personal digital assistant may cause a menu for the restaurant to be presented, or may ask the user 112 if the user wishes to make a reservation at the restaurant. In contrast, when it is discerned that the user 112 is viewing the second element, the personal digital assistant may cause time and location of the festival to be presented on the display 108.

It can therefore be ascertained that the system 100 supports means for modifying the visual content 116 based upon potential ambiguity, from the perspective of the ASR system 118, between at least one word corresponding to a first visual element and at least one word corresponding to a second visual element in the visual content. In an example, the potential ambiguity may be based upon similarity between pronunciation between at least one word corresponding to the first visual element and at least one word corresponding to the second visual element. In another example, the potential ambiguity may be based upon similarity between respective types of the visual elements (e.g., both visual elements are form fillable fields). The system 100 further supports means for displaying modified visual content, where distance between the first visual element and the second visual element has changed.

Figure 2:
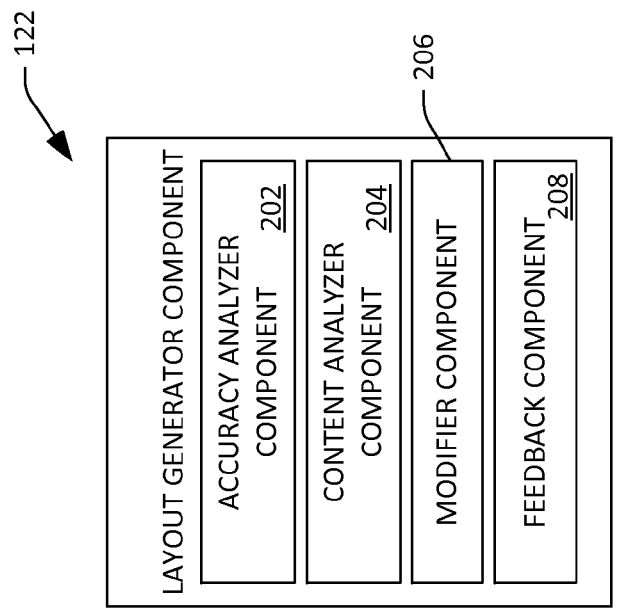
FIG. 2 is a functional block diagram of an exemplary layout generator component that is configured to modify a layout of visual content.

Now referring to FIG. 2, a functional block diagram of the layout generator component 122 is illustrated. The layout generator component 122 includes an accuracy analyzer component 202. The accuracy analyzer component 202 is configured to determine precision (accuracy) of the gaze tracker component 120 when determining gaze direction (based on images output by the camera 110). For example, the accuracy analyzer component 202 can determine the accuracy based upon a size of the display 108, a resolution of the camera 110, processing capabilities of the processor 104, size of the memory 106, distance of the user 112 from the display 108, etc. Pursuant to an example, the accuracy analyzer component 202 can identify an amount of error corresponding to determinations of gaze direction made by the gaze tracker component 120. The accuracy analyzer component 202, for instance, can output a probability distribution over pixels in the display 108 as a function of the position on the display 108 that the user 112 is determined to be viewing (e.g., by the gaze tracker component 120).

The layout generator component 122 also includes a content analyzer component 204 that analyzes elements in the visual content 116. Specifically, as referenced above, the content analyzer component 204 can identify elements in the visual content 116 that may give rise to ambiguity from the perspective of the ASR system 118 (and/or a personal digital assistant). For example, the visual content 116 may include two form-fillable fields in close proximity to one another, which may give rise to ambiguity from the perspective of the ASR system 118. In another example, images that include or reference objects that have some threshold similarity may give rise to ambiguity from the perspective of the ASR system 118. In yet another example, two words or two sequences of words that are acoustically similar may give rise to ambiguity from the perspective of the ASR system 118. In still yet another example, images, words or sequences of words that are topically similar may give rise to ambiguity from the perspective of the ASR system 118.

Accordingly, pursuant to the examples set forth above, the content analyzer component 204 can identify elements in the visual content 116 that may give rise to ambiguity from the perspective of the ASR system 118. Thus, the content analyzer component 204 can identify similar elements (e.g., form-fillable fields) in the visual content 116 that are in relative close proximity to one another. Further, the content analyzer component 204 can compute a value that is indicative of similarity in pronunciation between words or sequences referenced in the visual content 116. For instance, word pronunciations can be represented by a vector of values, and a distance-based algorithm can be employed to compute a distance between vectors. Likewise, the content analyzer component 204 can identify elements in the visual content 116 that are topically similar to one another. Moreover, the content analyzer component 204 can identify images in the visual content 116 that reference or depict objects that may give rise to ambiguity from the perspective of the ASR system 118. For instance, the content analyzer component 204 can include or be in communication with a system that performs object recognition in images, where such recognition can be based upon signatures of images (e.g., color signatures, gradient signatures, etc.). In an example, the visual content 116 may have a first image that includes or references a car, and may have a second image that includes or references a star. The content analyzer component 204 can output an indication that the two images may give rise to ambiguity from the perspective of the ASR system 118, due to the similarity between pronunciation of "car" and "star."

As referenced above, the content analyzer component 204 can utilize a distance-based algorithm to compute a distance value for a pair of elements, where the distance value is indicative of similarity between the elements (and thus is indicative of potential ambiguity). Such a distance-based algorithm may be well-suited for cases where elements (or element pronunciations) can be represented by vectors, and distance between vectors can be used to determine (acoustic) similarity between words or word sequences, similarity between images, etc. With respect to determining that two elements are topically similar, the content analyzer component 204 may have access to topics assigned to elements (e.g., by a search engine). When two elements are found to share a topic, the content analyzer component 204 can generate an output that indicates that the two elements are topically similar. The content analyzer component 204 can also analyze metadata in the visual content 116. For example, images and web pages often have metadata embedded therein, and the content analyzer component 204 can compare metadata assigned to elements in the visual content 116. The content analyzer component 204 can then output a value that is indicative of similarity between the elements based upon the comparison of the metadata.

The layout generator component 122 further comprises a modifier component 206 that modifies the visual content 116 based upon 1) the accuracy information output by the accuracy analyzer component 202; and 2) similarity values (e.g., confusability values) for pairs of elements output by the content analyzer component 204. For example, when the accuracy analyzer component 202 determines that the visual attention tracker component 120 is highly accurate, then even when the content analyzer component 204 determines that two elements in the visual content 116 are highly similar (and thus may give rise to ambiguity from the perspective of the ASR system 118), the modifier component 206 need not drastically change positions of the elements in the visual content 116. In another example, when the visual attention tracker component 120 is less accurate and the content analyzer component 204 identifies two elements that give rise to ambiguity from the perspective of the ASR system 118, then the modifier component 206 can modify the visual content 116 such that, in the modified visual content, the two elements are placed further apart from one another.

The layout generator component 122 can also include a feedback component 208 that provides feedback to the user 112 as to what the visual attention tracker component 120 has identified as the element being viewed by the user 112. For instance, when the visual attention tracker component 120 ascertains that the user 112 is viewing a particular element, the feedback component 208 can generate feedback that informs the user 112 that the ASR system 118 is being customized to expect input based upon such element. The output may be audible, wherein the audible output informs the user 112 as to the element that the visual attention tracker component 120 has ascertained that the user 112 is viewing. In another example, the feedback component 208 can cause a graphical icon, such as a mouse pointer, to be displayed on the element. In yet another example, the element may be highlighted. Highlighting elements may be particularly beneficial when the modified visual content includes form-fillable fields. The highlighting of the form-fillable field will indicate to the user 112 a type of content that the ASR system 118 expects to receive from the user 112. For example, if the form-fillable field corresponds to an airline departure, the form-fillable field can be highlighted indicating to the user 112 that the ASR system 118 expects to receive a name of a location (city, airport code, etc.).

Figure 3:
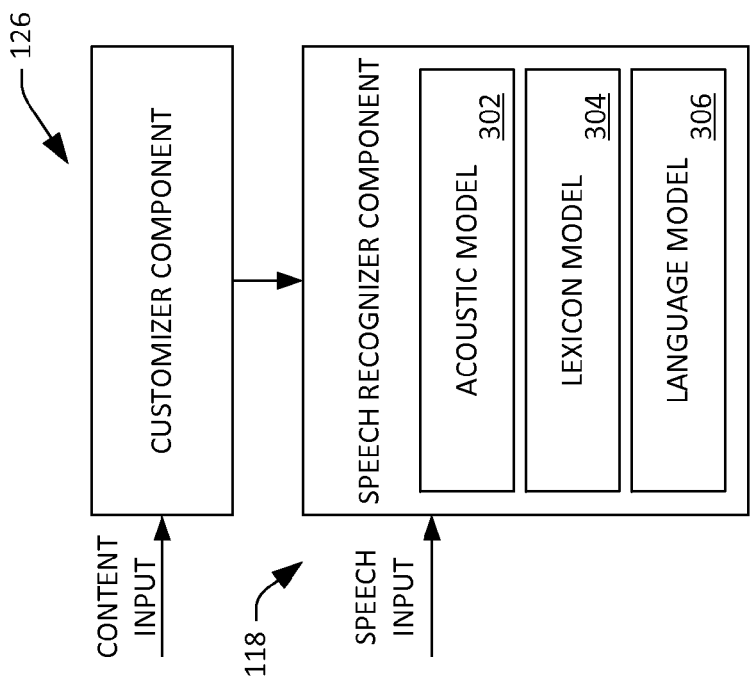
FIG. 3 is a functional block diagram of an automatic speech recognition (ASR) system that can be customized based upon estimated visual attention.

With reference now to FIG. 3, a functional block diagram of the ASR system 118 and the customizer component 126 is illustrated. The ASR system 118 includes an acoustic model 302, a lexicon model 304, and a language model 306. The acoustic model 302 models acoustic sounds (phones) emitted by humans. The lexicon model 304 models sequences of acoustic sounds, typically words in a particular language. The language model 306 models sequences of words in the particular language. Each of the models 302-306 have weights assigned thereto, wherein the weights are indicative of probabilities of observing what is being modeled (e.g., potentially based upon previous observations). In some cases, it may be desirable, however, to change the weights for different contexts.

The visual attention tracker component 120 can provide contextual information (e.g., what is of interest to the user on the display 108) based upon the determined gaze direction. The customizer component 126 can receive an indication of what the user 112 is currently viewing or has recently viewed, and can customize the ASR system 118 based upon such indication. For instance, the customizer component 126 can customize weights of one or more of the models 302-306 based upon what the user is currently viewing or has recently viewed. For example, when the user 112 is gazing at a form-fillable field for a departure city, the language model 304 and/or the lexicon model 306 can be customized to assign higher weights to words and word sequences corresponding to locations (e.g., cities with airports and/or airport codes). In another example, when the visual attention tracker component 120 determines that the user 112 is looking at an element that is descriptive of a particular restaurant, the customizer component 126 can receive this context and update one or more of the models 302-306 of the ASR system 118 to cause the ASR system 118 to more likely recognize food items in a spoken utterance of the user 112.

Further, as mentioned above, the customizer component 126, rather than modifying the weights assigned to the models 302-306 or in addition to modifying the weights assigned to the models 302-306, can select output of the ASR system 118 based upon the indication received from the visual attention tracker component 120 as to what is being viewed by the user 112. For example, the ASR system 118 can output a probability distribution over potential words and/or word sequences. The customizer component 126 can cause a word or word sequence to be selected based upon the indication received from the gaze tracker component 120, even when the word or word sequence is not the most probable word or word sequence.

Figure 4:
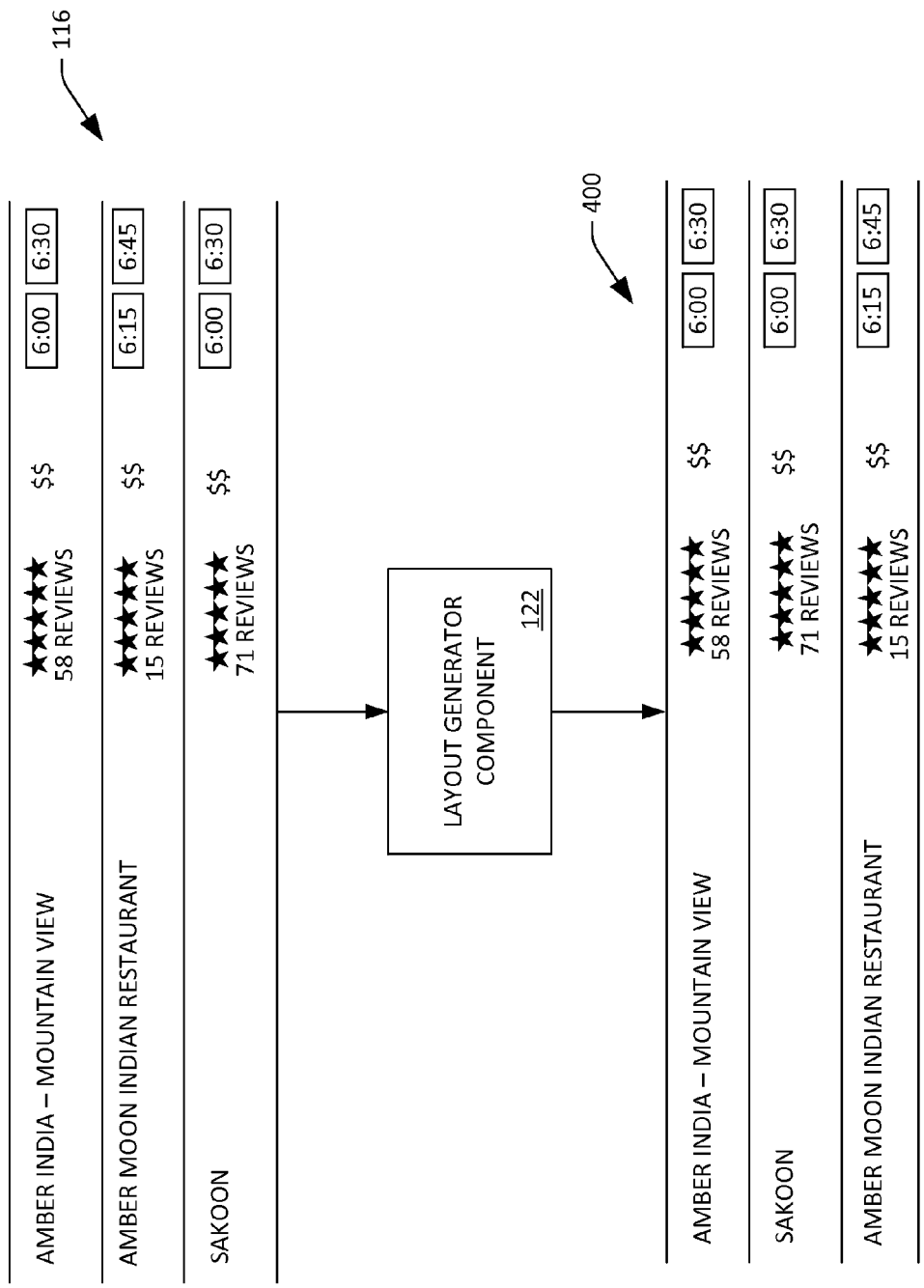
FIG. 4 illustrates an exemplary modification of visual content performed by the layout generator component.

Now referring to FIG. 4, an exemplary modification of visual content that can be performed by the layout generator component the 122 is illustrated. In this example, the visual content 116 includes three elements: 1) the word sequence "Amber India—Mountain View, 2) the word sequence "Amber Moon Indian Restaurant, and 3) the word "Sakoon". The content analyzer component 204 can determine that elements 1 and 2 are similar to one another, but that element 3 is not similar to either element 1 or element 2. Accordingly, the layout generator component 122 can modify the visual content 116 to generate modified visual content 400, which includes the same three elements, but placed in a second layout. Specifically, instead of elements 1 and 2 being adjacent to one another, element 3 is positioned between elements 1 and element 2. This modified visual content 400 helps the visual attention tracker component 120 disambiguate between when the user 112 is looking at element 1 and when the user 112 is looking at element 2. Accordingly, when the user 112 is looking at element 1, for example, and states "make reservations for Amber India", the ASR system 118 can be customized to better ascertain the intent of the user 112.

Figure 5:
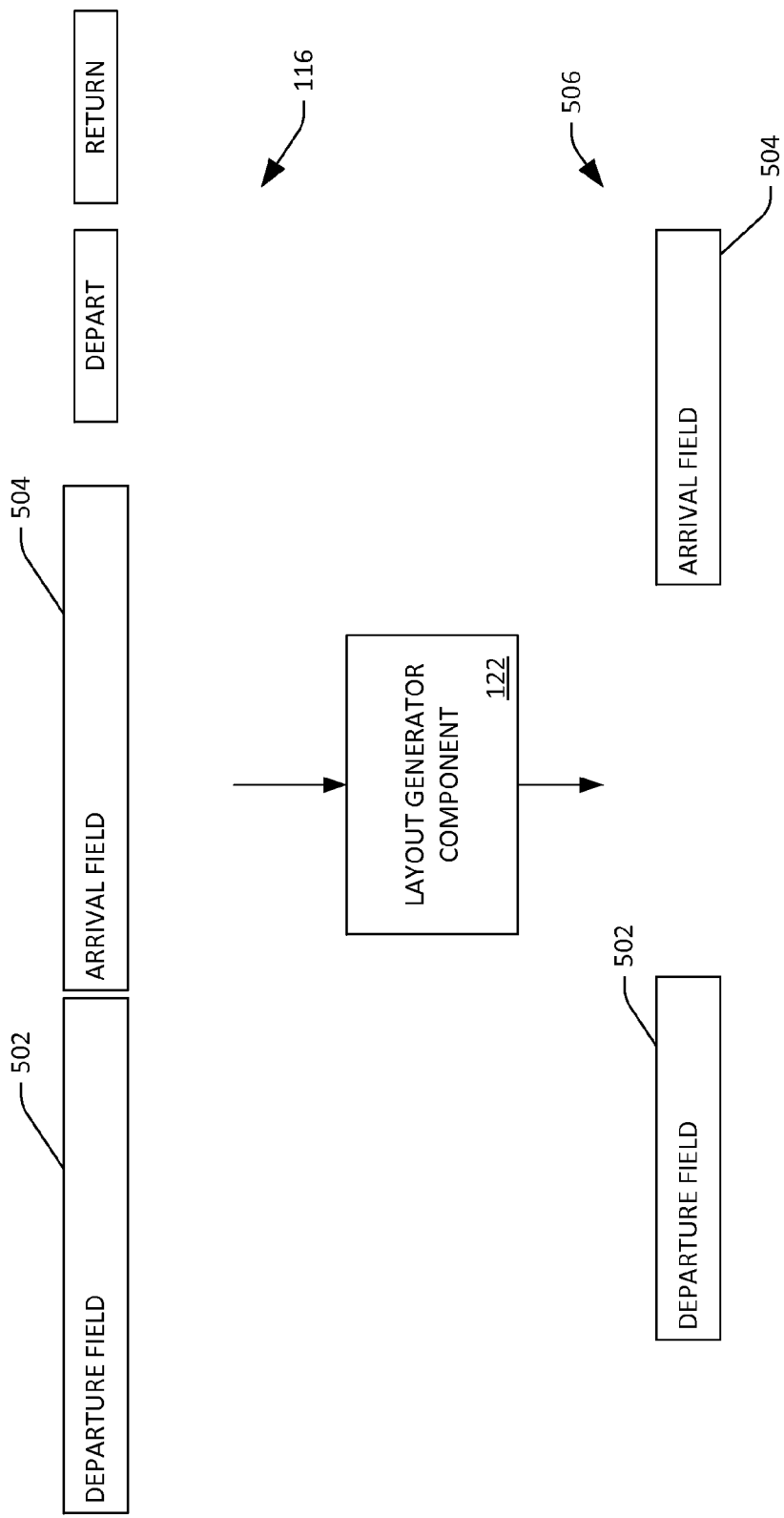
FIG. 5 illustrates another exemplary modification of visual content performed by the layout generator component.

With reference now to FIG. 5, another exemplary modification of visual content that can be performed by the layout generator component 122 is illustrated. In this example, the visual content 116 includes two elements; a first form-fillable field 502 that is configured to receive a departure city, and a second form-fillable field 504 that is configured to receive an arrival city. In the visual content 116, the first element 502 is in close proximity to the second element 504. Accordingly, when the user looks at either the first element 502 or the second element 504, the gaze tracker component 120 may not be able to ascertain with suitable confidence which of the elements 502 or 504 the user 112 is actually viewing.

Thus, the layout generator component 122 can modify the visual content 116 to create a modified visual layout 506, where the first element 502 and the second element 504 are distanced from one another. That is, in the visual content 116, the first element 502 is a first distance from the second element 504, while in the modified visual content 506, the first element 502 is a second distance from the second element 504, the second distance being greater than the first distance. In this example, then, the user 112 may view the first element 502, and the gaze tracker component 120 can ascertain with a relatively high confidence that the user 112 is viewing the first element 502 (rather than the second element 504). When the user 112 utters a name of a departure city or airport code, the ASR system 118 can recognize the departure city or airport uttered by the user 112, and the first element 502 can be populated with the city or airport uttered by the user 112 (rather than the second element 504).

Figure 6:
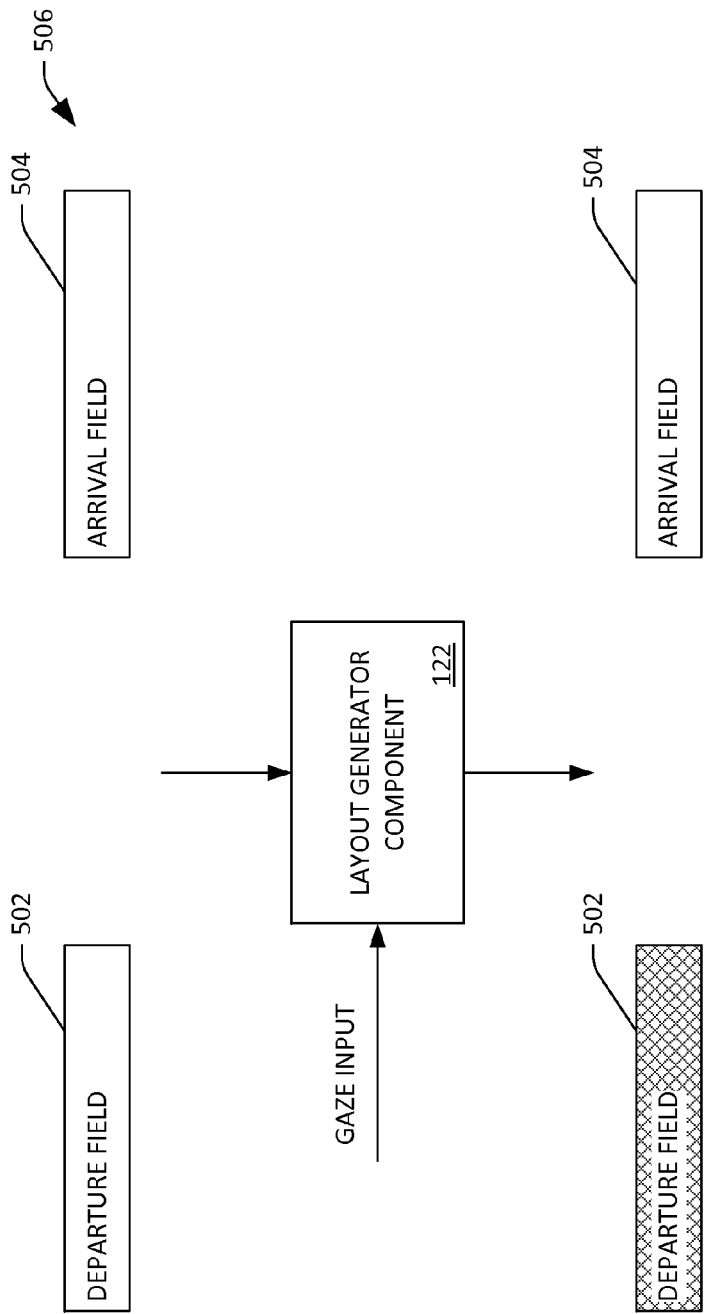
FIG. 6 illustrates provision of graphical feedback to a user.

Turning now to FIG. 6, another exemplary modification to visual content that can be performed by the layout generator component 122 is illustrated. In this example, the layout generator component 122 receives the modified visual content 506, which includes the first element 502 and the second element 504. The layout generator component 122 can also receive gaze input as identified by the gaze tracker component 122. Responsive to receiving the gaze input, the layout generator component 122 can provide an output that informs the user 112 as to which of the elements 502 or 504 the gaze tracker component 120 has estimated that the user 112 is viewing. In this example, it is estimated that the user 112 is viewing the first element 502, and accordingly the first element 502 is highlighted. The user 112 can then expect that when she sets forth a spoken utterance, such spoken utterance will be entered into the element 502 (rather than the element 504).

Figure 7:
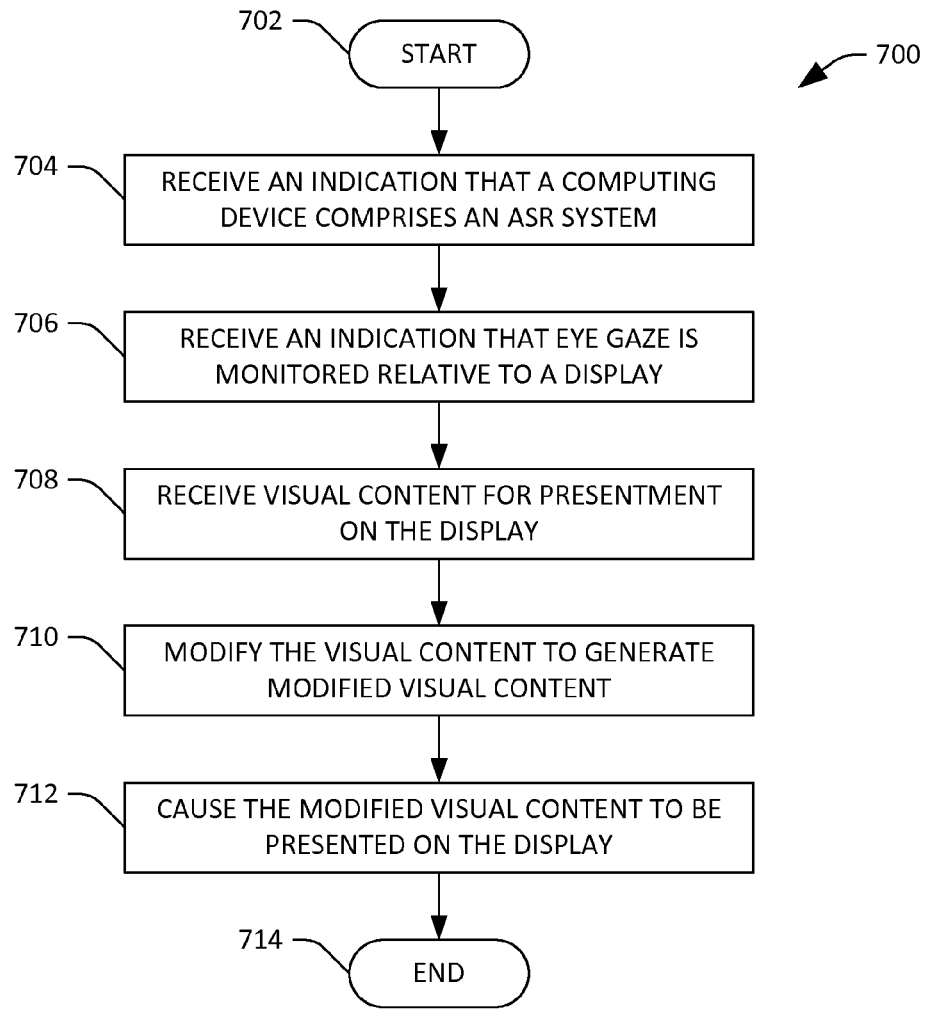
FIG. 7 is a flow diagram illustrating an exemplary methodology for modifying visual content to facilitate disambiguating what is being view by the user.
Figure 8:
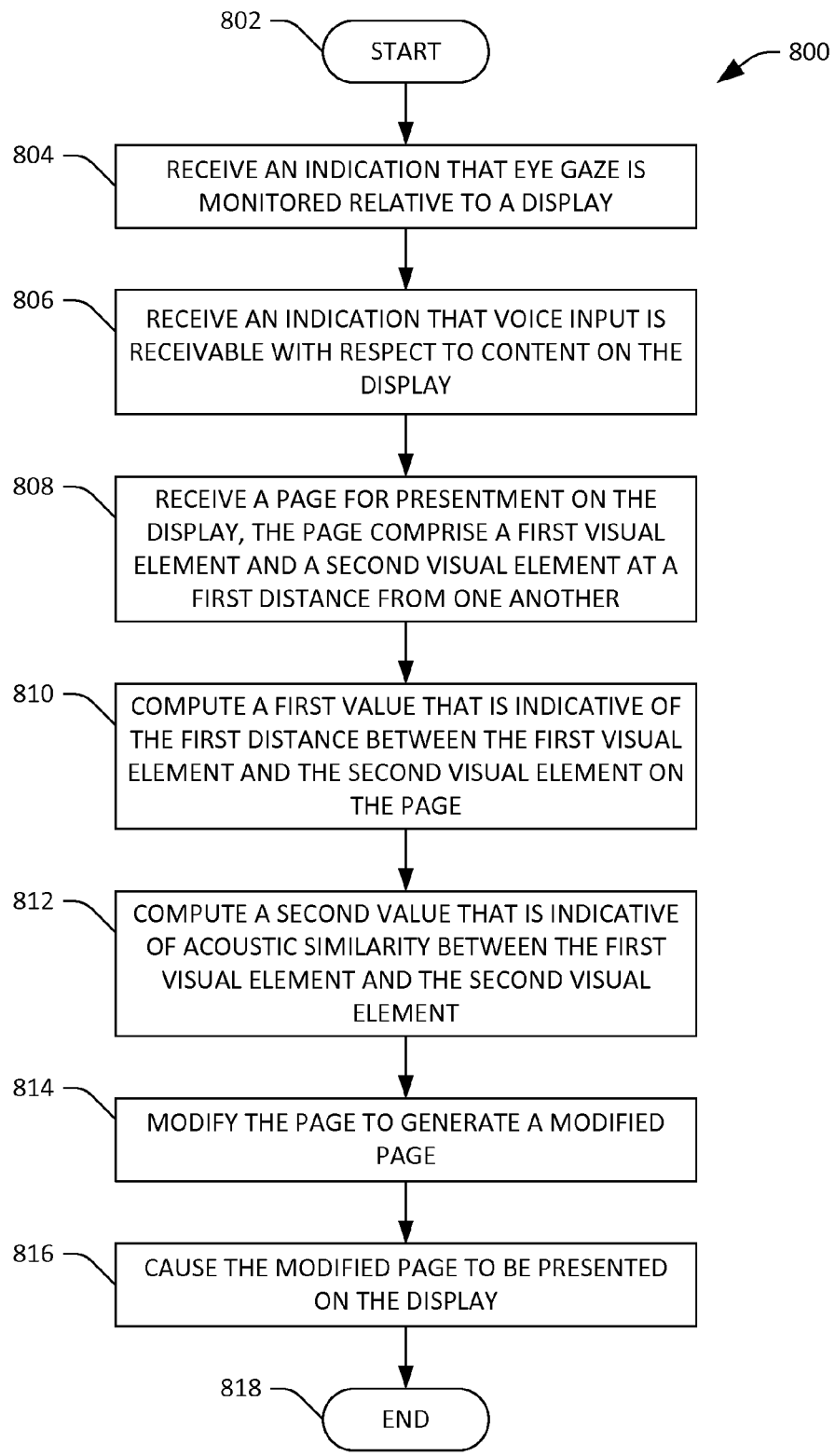
FIG. 8 is a flow diagram that illustrates an exemplary methodology for modifying a layout of visual content based upon a value that is indicative of confusability between elements in the visual content.

FIGS. 7-8 illustrate exemplary methodologies relating to modification of visual content for purpose of customizing an ASR system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 7, an exemplary methodology 700 for modifying visual content is illustrated. The methodology 700 starts at 702, and at 704, an indication is received that a computing device comprises an ASR system. At 706, an indication is received that visual attention is monitored relative to a display, and at 708, visual content for presentment on the display is received.

At 710, prior to causing the visual content to be presented on the display, the visual content is modified to generate modified visual content. This modification is based upon the indication that the computing device comprises the ASR system and the indication that visual attention is monitored relative to the display. As indicated above, the modification can include altering a layout of the visual content to generate a second layout. In another example, such modification can include altering a default zoom for the visual content. At 712, the modified visual content is caused to be presented on the display. Thereafter, for example, eye gaze of a viewer of the display can be estimated, and based upon what is identified as being viewed by the viewer, the ASR system can be customized. The methodology 700 completes at 714.

Now referring to FIG. 8, another exemplary methodology 800 for modifying visual content is illustrated. The methodology 800 starts at 802, and at 804, an indication that visual attention is monitored relative to a display is received. At 806, an indication that voice input is receivable with respect to content on the display is received. At 808, a page is received for presentment on the display, wherein the page comprises a first visual element and a second visual element at a first distance from one another. For example, the page can be a web page, although the methodology 800 is not so limited.

At 810, a first value is computed that is indicative of the first distance between the first visual element and the second visual element on the page. As indicated previously, the first visual element and the second visual element may be a first word or word sequence and a second word or word sequence, respectively. In another example, the first visual element and the second visual element can be first and second form-fillable fields, respectively. Still further, the first visual element and the second visual element may be first and second images, respectively. An element may also be a combination of these types of elements (or other elements).

At 812, a second value is computed, wherein the second value is indicative of acoustic similarity between the first visual element and the second visual element. At 814, the page is modified to generate a modified page, wherein the modified page includes the first visual element and the second visual element at a second distance from one another. Further, the modifying of the page at 814 is based upon the first value and the second value computed at 810 and 812, respectively. At 816, the modified page is caused to be presented on the display. The methodology 800 ends at 818.

Various examples are now set forth.

EXAMPLE 1

A method executed by a computing device, the method comprising: receiving visual content for presentment on the display; prior to causing the visual content to be presented on the display, modifying the visual content to generate new visual content based upon: the computing device supporting automatic speech recognition (ASR); and the computing devices supporting visual attention monitoring; and responsive to modifying the visual content, causing the new visual content to be presented on the display.

EXAMPLE 2

A method according to example 1, the visual content has a first layout, and wherein modifying the visual content to generate the new visual content comprises transforming the first layout to a second layout.

EXAMPLE 3

A method according to example 1, the first layout includes a first element and a second element with a first distance there between, and wherein modifying the visual content to generate the new visual content comprises altering distance between the first element and the second element such that in the second layout a second distance separates the first element from the second element.

EXAMPLE 4

A method according to example 1, wherein the first element comprises a first word or word sequence, the second element comprises a second word or word sequence, the method further comprising: computing a value that is indicative of acoustic similarity between the first word or word sequence and the second word or word sequence; and modifying the visual content to generate the modified visual content based upon the value that is indicative of the acoustic similarity between the first word or word sequence and the second word or word sequence.

EXAMPLE 5

A method according to any of examples 1-4, the visual content has a first zoom level, and wherein modifying the visual content to generate the new visual content comprises altering the first zoom level to a second zoom level.

EXAMPLE 6

A method according to any of examples 1-5, further comprising receiving images that include a viewer of the display; based upon the images, identifying an element in the new visual content presented on the display that is being viewed; and customizing the ASR system based upon the identifying of the element.

EXAMPLE 7

A method according to any of examples 1-6, further comprising receiving a signal from a microphone, the signal representative of a spoken utterance; and responsive to customizing the ASR system, recognizing the spoken utterance.

EXAMPLE 8

A method according to example 1, further comprising receiving signals that include a viewer of the display; based upon the signals, estimating that an element in the new visual content is being viewed; and responsive to estimating that the element is being viewed, generating an output that indicates that the element has been estimated as being viewed.

EXAMPLE 9

A method according to example 8, wherein generating the output comprises assigning a visual indicator to the element in the modified visual content.

EXAMPLE 10

A method according to any of examples 8-9, wherein the element is a form-fillable field.

EXAMPLE 11

A method accordingly to any of examples 1-10, the visual content comprises a first form-fillable field and a second form-fillable field, and modifying the visual content to generate the new visual content comprises repositioning at least one of the first form-fillable field or the second form-fillable field such that the first form-fillable field is positioned further apart from the second form-fillable field.

EXAMPLE 12

A computing device comprising: a processor; and a memory that comprises a plurality of components that are executed by the processor, the plurality of components comprising: a layout generator component that receives visual content that is to be presented on a display, the visual content has a first layout, the layout generator component, prior to the visual content being presented on the display, modifies the visual content such that the visual content, when modified, has a second layout, the layout generator component modifies the visual content based upon visual attention being tracked relative to the display, wherein the second layout is different from the first layout; and a renderer component in communication with the layout generator component, the renderer component renders the visual content with the second layout for presentment on the display.

EXAMPLE 13

A computing device according to example 12, the plurality of components further comprising: a gaze tracker component that receives images from a camera, the gaze tracker component identifies a gaze direction based upon the images, the gaze tracker component estimates an element being viewed on the display based upon the gaze direction, wherein the layout generator component causes graphical data to be presented on the display that indicates that the element is estimated as being viewed.

EXAMPLE 14

A computing device according to example 13, the element is a form-fillable field, and the graphical data is a highlighting of the form-fillable field.

EXAMPLE 15

A computing device according to any of examples 12-14, the plurality of components further comprise a gaze tracker component that receives images from a camera, the gaze tracker component identifies a gaze direction based upon the images, the gaze tracker component estimates an element being viewed on the display based upon the gaze direction, the memory further comprises an automatic speech recognition (ASR) system that is executed by the processor, the ASR system is configured to receive an audio signal and recognize a spoken utterance in the audio signal, the speech recognition system recognizes the spoken utterance based upon the element estimated as being viewed by the gaze tracker component.

EXAMPLE 16

A computing device according to example 15, the plurality of components further comprising a customizer component that customizes the ASR system based upon the element estimated as being viewed by the gaze tracker component.

EXAMPLE 17

A computing device according to any of examples 12-16, wherein the first layout includes a first element and a second element that are at first positions relative to one another, and wherein the second layout includes the first element and the second element at second positions relative to one another.

EXAMPLE 18

A computing device according to example 17, wherein the layout generator component modifies the visual content based upon a value that is indicative of acoustic similarity between the first element and the second element.

EXAMPLE 19

A computing device according to any of examples 12-18, the visual content included in a web page that is to be displayed on the display.

EXAMPLE 20

A computer-readable storage medium comprising instructions that, when executed by a processor, cause the processor to perform acts comprising: receiving a page for presentment on a display, the page comprises a first visual element and a second visual element at a first distance from one another; modifying the page to generate a modified page, the modified page includes the first visual element and the second visual element at a second distance from one another, modifying of the page is based upon similarity of pronunciation between at least one word corresponding to the first visual element and at least one word corresponding to the second visual element; and causing the modified page to be displayed on the display.

EXAMPLE 21

A computing system is described herein, wherein the computing system comprises: means for performing visual attention tracking; means for performing automatic speech recognition; and means for modifying graphical layout of a page based upon the means for performing visual attention tracking and the means for performing automatic speech recognition.

Figure 9:
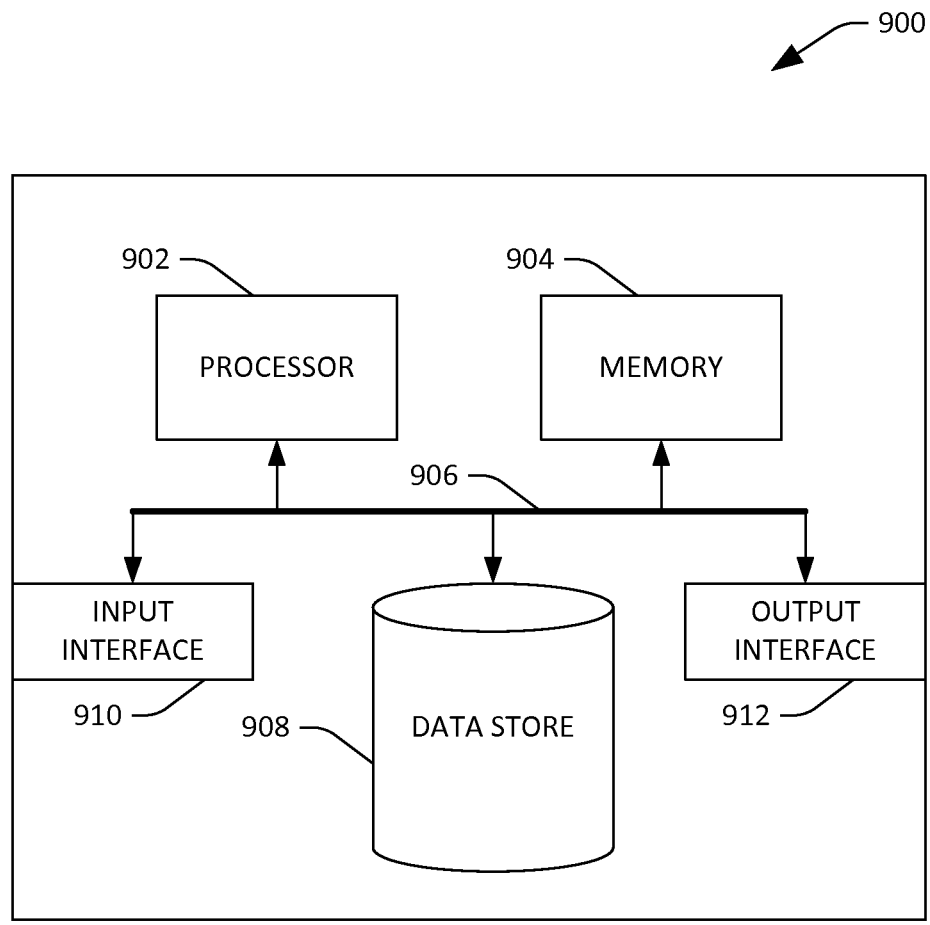
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that supports visual attention tracking. By way of another example, the computing device 900 can be used in a system that supports ASR. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store visual content, spoken utterances, etc.

The computing device 900 additionally includes a data store 908 that is accessible by the processor 902 by way of the system bus 906. The data store 908 may include executable instructions, visual content, spoken utterances, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like, and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a computing device, the method comprising:
   receiving visual content for presentment on a display;
   prior to causing the visual content to be presented on the display, modifying the visual content to generate new visual content based upon:
      the computing device supporting automatic speech recognition (ASR); and
      the computing devices supporting visual attention monitoring; and
   responsive to modifying the visual content, causing the new visual content to be presented on the display;

estimating that a viewer is viewing an element in the new visual content; and responsive to estimating that the viewer is viewing the element in the new visual content, assigning a visual indicator to the element in the new visual content.

2. The method of claim 1, the visual content has a first layout, and wherein modifying the visual content to generate the new visual content comprises transforming the first layout to a second layout.

3. The method of claim 2, the first layout includes the element and a second element with a first distance there between, and wherein modifying the visual content to generate the new visual content comprises altering distance between the element and the second element such that in the second layout a second distance separates the element from the second element.

4. The method of claim 3, wherein the element comprises a first word or word sequence, the second element comprises a second word or word sequence, the method further comprising:

computing a value that is indicative of acoustic similarity between the first word or word sequence and the second word or word sequence; and modifying the visual content to generate the modified visual content based upon the value that is indicative of the acoustic similarity between the first word or word sequence and the second word or word sequence.

5. The method of claim 1, the visual content has a first zoom level, and wherein modifying the visual content to generate the new visual content comprises altering the first zoom level to a second zoom level.

6. The method of claim 1, further comprising:
customizing an ASR system based upon the element being estimated as being viewed by the viewer.

7. The method of claim 6, further comprising:
receiving a signal from a microphone, the signal representative of a spoken utterance; and
responsive to customizing the ASR system, recognizing the spoken utterance.

8. The method of claim 1, further comprising:
subsequent to assigning the visual indicator to the element in the new visual content, estimating that the viewer is viewing a second element in the new visual content; and
responsive to estimating that the viewer is viewing the second element, assigning the visual indicator to the second element and removing the visual indicator from the element.

9. The method of claim 8, wherein the visual indicator is a highlight.

10. The method of claim 9, wherein the element is a form-fillable field.

11. The method of claim 1, the visual content comprises a first form-fillable field and a second form-fillable field, and modifying the visual content to generate the new visual content comprises repositioning at least one of the first form-fillable field or the second form-fillable field such that the first form-fillable field is positioned further apart from the second form-fillable field.

12. A computing device comprising:
at least one processor; and
memory that stores instructions that, when executed by the at least processor, cause the at least one processor to perform acts comprising:
receiving visual content that is to be presented on a display, the visual content has a first layout, wherein the first layout includes a first element and a second element that are at first positions relative to one another, and wherein the second layout includes the first element and the second element at second positions relative to one another;

prior to the visual content being presented on the display, modifying the visual content such that the visual content, when modified, has a second layout that is different from the first layout, the visual content is modified based upon:
visual attention being tracked relative to the display; and
a value that is indicative of acoustic similarity between the first element and the second element; and
rendering the visual content with the second layout for presentment on the display.

13. The computing device of claim 12, the acts further comprising:
receiving images from a camera, the images capture a user viewing the display;
identifying a gaze direction of the user based upon the images;
estimating that the first element is being viewed by the user based upon the gaze direction; and
causing graphical data to be presented on the display that indicates that the first element is estimated as being viewed by the user.

14. The computing device of claim 13, the first element is a form-fillable field, and the graphical data is a highlighting of the form-fillable field.

15. The computing device of claim 12, the acts further comprising:
receiving images from a camera, the images capture a user viewing the display;
identifying a gaze direction of the user based upon the images;
estimating that the first element is being viewed by the user based upon the gaze direction;
receiving an audio signal, the audio signal includes a spoken utterance set forth by the user; and
recognizing, by an automatic speech recognition (ASR) system, the spoken utterance in the audio signal based upon the first element estimated as being viewed by the user.

16. The computing device of claim 15, the acts further comprising customizing the ASR system based upon the first element estimated as being viewed by the user.

17. The computing device of claim 12, the visual content included in a web page that is to be displayed on the display.

18. A computer-readable storage medium comprising instructions that, when executed by a processor, cause the processor to perform acts comprising:
receiving a page for presentment on a display, the page comprises a first visual element and a second visual element at a first distance from one another;
modifying the page to generate a modified page, wherein modifying the page comprises altering a position of at least one of the first visual element or the second visual element such that the first visual element and the second visual element are at a second distance from one another in the modified page that is different from the first distance, and further wherein modifying of the page is based upon similarity of pronunciation between at least one word corresponding to the first visual element and at least one word corresponding to the second visual element; and
causing the modified page to be displayed on the display.

19. The computer-readable storage medium of claim 18, the acts further comprising:
   estimating that the first visual element is being viewed by a viewer; and
   modifying an automatic speech recognition (ASR) system responsive to estimating that the first visual element is being viewed by the viewer.

20. The computer-readable storage medium of claim 18, the acts further comprising:
   estimating that the first visual element is being viewed by a viewer; and
   highlighting the first visual element responsive to estimating that the first visual element is being viewed by the viewer.

* * * * *